United States Patent
Kalra et al.

(10) Patent No.: US 12,355,913 B2
(45) Date of Patent: Jul. 8, 2025

(54) USING SUBSCRIBER EVENT DATA TO CONTROL RELEASE OPERATIONS RELATED TO COMMUNICATION SESSION IN COMMUNICATIONS NETWORK

(71) Applicant: Telefonaktiebolaget LM Ericsson (publ), Stockholm (SE)

(72) Inventors: Amit Kalra, Gurgaon Haryana (IN); Robert Törnkvist, Karlskrona (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 412 days.

(21) Appl. No.: 18/012,265

(22) PCT Filed: Jul. 1, 2020

(86) PCT No.: PCT/SE2020/050692
§ 371 (c)(1),
(2) Date: Dec. 22, 2022

(87) PCT Pub. No.: WO2022/005349
PCT Pub. Date: Jan. 6, 2022

(65) Prior Publication Data
US 2023/0262170 A1    Aug. 17, 2023

(51) Int. Cl.
*H04W 4/24*      (2024.01)
*H04M 15/00*    (2006.01)
*H04W 76/38*    (2018.01)

(52) U.S. Cl.
CPC ....... *H04M 15/60* (2013.01); *H04M 15/8228* (2013.01); *H04W 76/38* (2018.02)

(58) Field of Classification Search
CPC . H04W 72/04; H04W 52/0229; H04W 76/28; H04W 52/0232; H04W 72/30;
(Continued)

(56) References Cited

U.S. PATENT DOCUMENTS 10,091,008 B2    10/2018   Sharma et al.
2010/0144363 A1   6/2010   De Rosa et al.
(Continued)

FOREIGN PATENT DOCUMENTS

WO    2019219619 A1    11/2019

OTHER PUBLICATIONS

Extended European Search Report for European Patent Application No. 20943155.0 dated Jul. 17, 2023, 16 pages.
(Continued)

*Primary Examiner* — Phuoc H Doan
(74) *Attorney, Agent, or Firm* — Sage Patent Group

(57) ABSTRACT

A network node of a communications network performs operations to determine a data traffic inactivity timer value based on subscriber event data, which identifies a subscriber and service characteristics using a communication session, being processed through a predictive model which uses historical usage data indicating idle times previously measured by charging trigger functions (CTFs) for the subscriber and the service characteristics. The operation further communicate the data traffic inactivity timer value to a CTF to configure monitoring of inactivity of the service using the communication session and to trigger a release operation related to the communication session when a data traffic inactivity timer using the data traffic inactivity timer value is determined to expire based on the monitored inactivity of the service.

20 Claims, 5 Drawing Sheets

(58) Field of Classification Search
CPC ... H04W 72/231; H04W 76/38; H04M 15/60; H04M 15/8228
See application file for complete search history.

(56) References Cited

U.S. PATENT DOCUMENTS

| | | |
|---|---|---|
| 2012/0124196 A1 | 5/2012 | Brisebois et al. |
| 2014/0211676 A1 | 7/2014 | Chhabra |
| 2015/0271342 A1 | 9/2015 | Gupta et al. |
| 2016/0135247 A1 | 5/2016 | Ozturk et al. |
| 2017/0180978 A1 | 6/2017 | Iwai et al. |
| 2019/0254104 A1 | 8/2019 | Gurumoorthy et al. |
| 2019/0387490 A1 | 12/2019 | Li et al. |
| 2020/0100088 A1* | 3/2020 | Kim ............... H04W 48/16 |
| 2022/0007456 A1* | 1/2022 | Bao ............... H04W 76/27 |

OTHER PUBLICATIONS

3GPP TS 23.288 V1.0.0, "3rd Generation Partnership Project; Technical Specification Group Services and System Aspects; Architecture enhancements for 5G System (5GS) to support network data analytics services (Release 16)," May 2019, 52 pages.

3GPP TS 32.291 V15.5.0, "3rd Generation Partnership Project; Technical Specification Group Services and System Aspects; Telecommunication management; Charging management; 5G system, charging service; Stage 3 (Release 15)," Dec. 2019, 81 pages.

International Search Report and Written Opinion of the International Searching Authority for PCT International Application No. PCT/SE2020/050692 dated Apr. 1, 2021.

3GPP TR 23.700-91 V17.0.0, "3rd Generation Partnership Project; Technical Specification Group Services and System Aspects; Study on enablers for network automation for the 5G System (5GS); Phase 2 (Release 17)," Dec. 2020, 382 pages.

3GPP TS 32.255 V16.4.0, "3rd Generation Partnership Project; Technical Specification Group Services and System Aspects; Telecommunication management; Charging management; 5G data connectivity domain charging; stage 2 (Release 16)," Mar. 2020, 101 pages.

3GPP TS 32.290 V16.3.0, "3rd Generation Partnership Project; Technical Specification Group Services and System Aspects; Telecommunication management; Charging management; 5G system; Services, operations and procedures of charging using Service Based Interface (SBI) (Release 16)," Dec. 2019, 34 pages.

* cited by examiner

USING SUBSCRIBER EVENT DATA TO CONTROL RELEASE OPERATIONS RELATED TO COMMUNICATION SESSION IN COMMUNICATIONS NETWORK

CROSS REFERENCE TO RELATED APPLICATION

This application is a 35 U.S.C. § 371 national stage application of PCT International Application No. PCT/SE2020/050692 filed on Jul. 1, 2020, the disclosure and content of which is incorporated by reference herein in its entirety.

TECHNICAL FIELD

The present disclosure relates to communications networks and controlling release operations related to communication sessions through communication networks.

BACKGROUND

In the area of 5G/IoT (Internet of Things) converged charging in the domain of BSS (Business Support Systems), different network elements are proposed/standardized by 3GPP that carry out dedicated functionality. These network elements are deployed through various deployment ways such as, e.g., bare metal, virtualized, and containerized. But, in all of these deployments, resource optimization (e.g., compute resource utilization, storage resource utilization, and network resource utilization) has been an area of keen interest to service providers. With the advent of 5G/IoT networks, such resource optimization has become even more important given that there is predicted to be a tremendous increase in number of devices connecting to the network and use of widely differing devices having different requirements regarding services and features.

3GPP standard 32.290 v16.3.0 discloses communication operations between NF (CTF) and Charging Function (CHF). 3GPP standard 32.255 v16.4.0 discloses different trigger types used during these communications. One of those trigger types is "Unit Count Inactivity Timer" that depicts threshold for the time period when no units have been counted by the Session Management Function (SMF) during an ongoing session. It holds either the value configured in a SMF, if it is supported, or the value to be used as received from the CHF.

The existing standards disclose handling of communication between different network functions in 5G/IoT network. However, the disclosed operations may result in network resources being unnecessarily occupied during the ongoing sessions even if there is no usage/signaling happening over those sessions.

SUMMARY

Some embodiments of the present disclosure are directed to a method by a network node of a communications network. The method includes determining a data traffic inactivity timer value based on subscriber event data, which identifies a subscriber and service characteristics using a communication session, being processed through a predictive model which uses historical usage data indicating idle times previously measured by charging trigger functions (CTFs) for the subscriber and the service characteristics. The method further includes communicating the data traffic inactivity timer value to a CTF to configure monitoring of inactivity of the service using the communication session and to trigger a release operation related to the communication session when a data traffic inactivity timer using the data traffic inactivity timer value is determined to expire based on the monitored inactivity of the service.

Some other embodiments of the present disclosure are directed to a method by a charging trigger function (CTF) of a communications network. The method includes sending a charging data request message to a charging function (CHF) network node, and receiving a charging data response message containing a data traffic inactivity timer value and configuration data. The method generates idle time measurements of communication session idle times for a subscriber being provided a service through the communication session, where the idle time measurements are performed according to the configuration data to generate reports containing data characterizing the idle time measurements and identifying the subscriber and the service characteristics. The method sends the reports to the CHF network node or to another network node. The method also sends a release message to the CHF network node to trigger a release operation related to the communication session when a data traffic inactivity timer using the data traffic inactivity timer value is determined to expire based on the idle time measurements of the communication session.

Some other embodiments are directed to a network node of a communications network, which includes at least one processor and at least one memory coupled to the at least one processor and storing computer readable program code that when executed by the at least one processor causes the at least one processor to perform operations. The operations are configured to determine a data traffic inactivity timer value based on subscriber event data, which identifies a subscriber and service characteristics using a communication session, being processed through a predictive model which uses historical usage data indicating idle times previously measured by charging trigger functions, CTFs, for the subscriber and the service characteristics. The operations are further configured to communicate the data traffic inactivity timer value to a CTF to configure monitoring of inactivity of the service using the communication session and to trigger a release operation related to the communication session when a data traffic inactivity timer using the data traffic inactivity timer value is determined to expire based on the monitored inactivity of the service.

Some other embodiments are directed to a CTF of a communications network, that includes at least one processor and at least one memory coupled to the at least processor and storing computer readable program code that when executed by the at least one processor causes the at least one processor to perform operations. The operations are configured to send a charging data request message to a CHF network node, and receive a charging data response message containing a data traffic inactivity timer value and configuration data. The operations are further configured to generate idle time measurements of communication session idle times for a subscriber being provided a service through the communication session, where the idle time measurements are performed according to the configuration data to generate reports containing data characterizing the idle time measurements and identifying the subscriber and the service characteristics. The operations send the reports to the CHF network node. The operations also send a release message to the CHF network node to trigger a release operation related to the communication session when a data traffic inactivity timer using the data traffic inactivity timer value is determined to expire based on the idle time measurements of the communication session.

Potential advantages that may be provided by one or more of the embodiments of the present disclosure can include that the service providers are provided an ability to optimize how session handling is controlled during 5G/IoT charging which can lead to more optimum resource utilization of the network elements (e.g., compute resource utilization, storage resource utilization, and network resource utilization). As explained, with a large of number of services available in 5G, such optimization can result in more effective utilization of network resources for communication sessions and increased availability and responsiveness of services for end subscribers. As a result, these embodiments may cause increased revenue streams for the network service providers.

It is noted that aspects described with respect to one embodiment may be incorporated in different embodiments although not specifically described relative thereto. That is, all embodiments and/or features of any embodiments can be combined in any way and/or combination. Moreover, other network nodes and CTFs and corresponding methods and computer program products according to embodiments will be or become apparent to one with skill in the art upon review of the following drawings and detailed description. It is intended that all such other network nodes and CTFs and corresponding methods and computer program products be included within this description and protected by the accompanying claims.

BRIEF DESCRIPTION OF THE DRAWINGS

Aspects of the present disclosure are illustrated by way of example and are not limited by the accompanying drawings. In the drawings.

DETAILED DESCRIPTION

Figure 1:
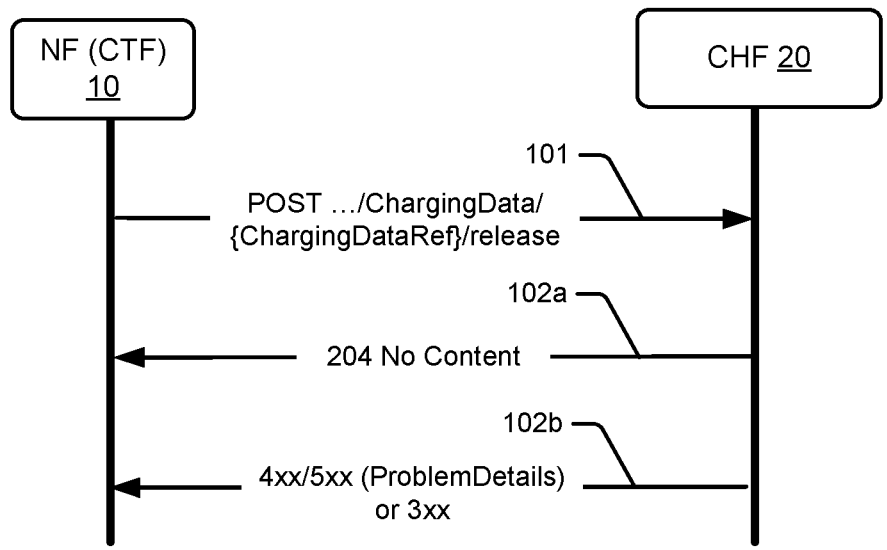
FIG. 1 illustrates a system basic block diagram with communications between NF (CTF) and CHF relating to Nchf converged charging release in accordance with some embodiments of the present disclosure.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of various present inventive concepts to those skilled in the art. It should also be noted that these embodiments are not mutually exclusive. Components from one embodiment may be tacitly assumed to be present/used in another embodiment.

Various embodiments of the present disclosure are directed to determining historical information about the usage data of the 5G subscribers (or IoT devices) to determine an optimized value of "Unit Count Inactivity Counter". In some embodiments, the network function (NF) including Charging Trigger Function (CTF) transmits the charging data request messages towards Charging Function (CHF). Further, the CHF sends a request message requesting a Network Data Analytical Function (NWDAF) generate an idle score based on historical information that the NWDAF retains about the usage data of the subscriber or IoT device which indicates previously tracked idle behaviour of the subscriber (or IoT device). In one embodiment, the NWDAF generates a data repository containing or characterizing (e.g., statistically characterizing) the historical information which is obtained by setting up monitors in the network for retrieving reports of the subscribers' (or IoT device's) idle behavior. Using the historical information, the NWDAF determines an idle score (representing the idle behavior of the subscriber or the IoT device) and transmits the idle score back to the CHF in response to the request message. Based on the idle score the CHF determines the "Unit Count Inactivity Timer" value that is best suited for the subscriber (or the IoT device). The CHF prepares and sends a charging data response message (including the determined "Unit Count Inactivity Timer") to the CTF.

For brevity, the term "subscriber" is also used interchangeably with device, such as an IoT device, user equipment, etc. without limitation. The subscriber may correspond to a person's identity, a device identity, an application identity for an application being executed by a device, etc. An "application" may be user installed or focused software (e.g., web browser software, game software, audio and/or video streaming software, utility software, multimedia messaging software, etc.) or device operating system layer(s) without limitation.

In some embodiments, the response to the charging data request is modified so that the CHF can request the CTF to report on the idle times of the subscriber (or the IoT device), which may be performed with some restrictions based on thresholds. The CTF monitors the data session by the subscriber (or the IoT device) and provides the idle time information to the CHF. The CHF then passes this information to the NWDAF for use in updating the idle behaviour of the subscriber (or IoT device) that is tracked (stored) in the data repository of the NWDAF, as explained herein according to embodiments of the present disclosure.

Potential advantages that may be provided by one or more of the embodiments of the present disclosure can include that the service providers are provided an ability to optimize how session handling is controlled during 5G/IoT charging which can lead to more optimum resource utilization of the network elements (e.g., compute resource utilization, storage resource utilization, and network resource utilization). As explained, with a large of number of services available in 5G, such optimization can result in more effective utilization of network resources for communication sessions and increased availability and responsiveness of services for end subscribers. As a result, these embodiments may cause increased revenue streams for the network service providers.

FIG. 1 illustrates a system basic block diagram with communications between NF (CTF) 10 and CHF 20 relating to Nchf converged charging release for one type of service operation: Nchf_ConvergedCharging_Release in the 5G Service Based Interface (SBI) communication. The system includes the network function (NF) having the Charging Trigger Function (CTF) 10. The CTF 10 can reside in any network element or function (e.g. Session Management Function (SMF)) that provides service access to the subscribers. The system also includes a Charging Function (CHF) 20 that handles credit control management for the subscribers in accordance with the standard 3GPP network architecture. For example, the CHF 20 can be responsible for converged online charging and offline charging functionalities, and provides quota, re-authorization triggers, rating conditions and is notified about usage reports from a SMF or from the NF (CTF) 10 which may be part of a SMF.

The CHF (NF Service Producer) 20 may determine that a service requires termination. The NF Service Producer may perform this termination synchronously if it has a request pending processing by returning response.

If the CHF (NF Service Producer) 20 does not have a pending request (asynchronous), the NF Service Producer may trigger an abort notification to terminate the charging session. On reception of an abort notification, the NF consumer shall terminate the associated charging session by sending a Nchf_ConvergedCharging_Release. If the associated charging session is not currently active or NF consumer does not terminate the charging session for any other reason, the corresponding error response is returned.

The CTF (NF Service Consumer) 10 may determine service termination. For session based charging the update request shall include the used units. For event based charging there may be no used unit reported.

The Nchf_ConvergedCharging_Release service operation provides means for NF (CTF) 10 to terminate charging Session.

The following procedures using the Nchf_ConvergedCharging_Release service operation are supported:
  Expiry of unit count inactivity timer in NF Consumer.
  Abort notification is received from CHF.
  Service termination in NF Consumer.

Regarding the first procedure (Expiry of unit count inactivity timer in NF Consumer) with reference to FIG. 1, the NF (CTF) 10 can initiate 101 the release operation (Nchf converged charging release) towards CHF 20 based on the NF (CTF) 10 (which can be a SMF) determining that no units have been counted by SMF for the configured amount of time (i.e. "Unit Count Inactivity Timer"). That is, until the time "Unit Count Inactivity Timer" has elapsed, the charging session is kept open utilizing the associated network resources. The CHF 20 sends messages 102*a* and 102*b* which can be provided as acknowledgements. Accordingly, there would be associated advantages achieved if the amount of time the communication session and associated charging session is kept open can be optimized for different subscribers (or IoT devices) so the communication session will be terminated in a more optimal amount of time when not needed and the associated network resources are freed up for use by other communication session(s), if required. Further embodiments will now be discussed with reference to subsequent figures.

Figure 2:
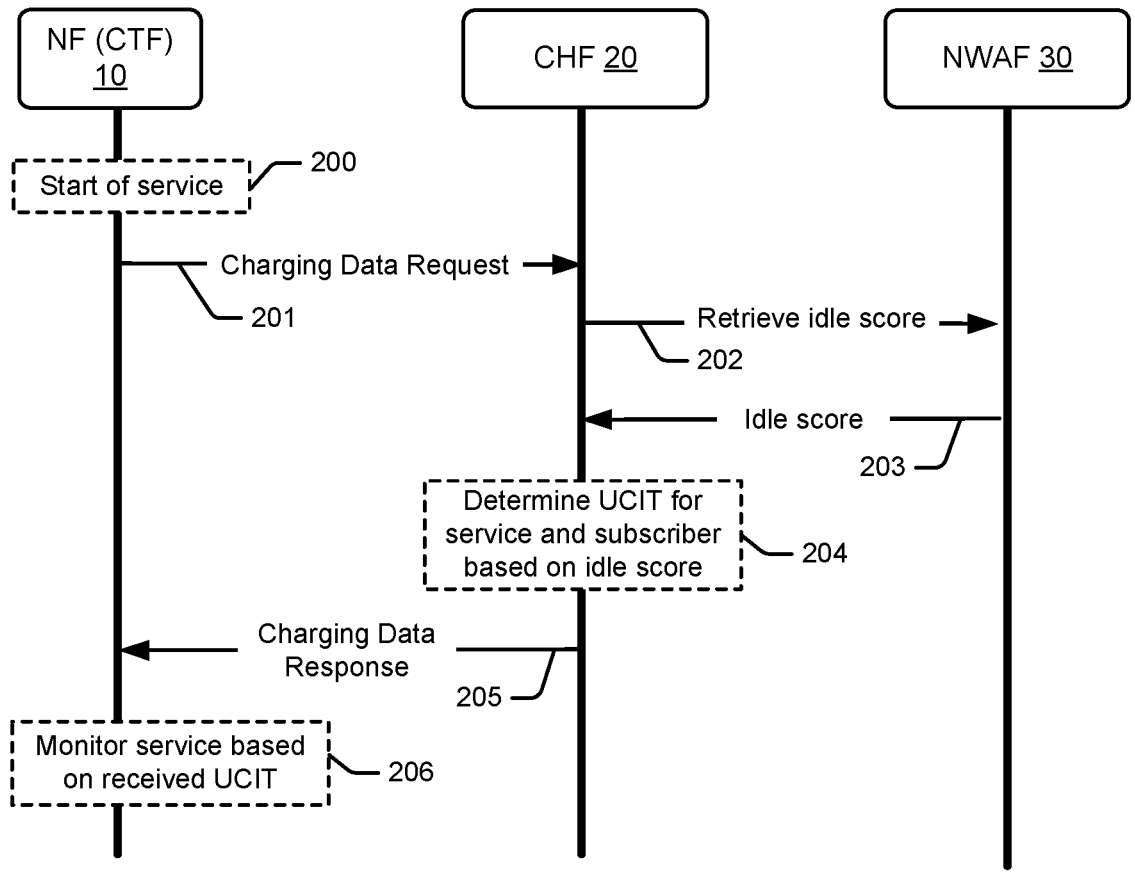
FIG. 2 illustrates a data flow diagram for messaging related to a data session initiated by a 5G subscriber (or IoT device) in accordance with some embodiments of the present disclosure.

FIG. 2 illustrates a data flow diagram in accordance with some embodiments. The data flow diagram depicts the messages for a data session initiated by a 5G subscriber (or IoT device). Only the messages and network elements that are relevant to these embodiments are illustrated in the data flow diagram. As discussed with reference to FIG. 1, Charging Function (CHF) 20 handles credit control management for the subscribers and the Charging Trigger Function (CTF) 10 (e.g. SMF) provides service access to the subscribers. Further, the CTF 10 handles the monitoring of the session and interacts with the CHF 20. The Network Data Analytics Function (NWDAF) maintains the historical usage information about the subscribers.

The NF (CTF) 10, CHF 20, and the NWDAF 30 may be implemented in various network nodes of a 5G Core Network (5GC). Although FIG. 2 has been depicted with reference to a 5G network architecture; however, these embodiments are also applicable for 3G/LTE networks.

The CTF 10 operates to request credit information for the subscribers and service, and the CHF 20 allocates and provides the information based on the subscriber's accounts. Further, the CHF 20 may operate to instruct the CTF 10 how to handle and monitor the ongoing service by setting different types of triggers, e.g. Quality of Service (QoS) change, radio access technology (RAT) type change, Tariff time change, etc. along with the associated category (i.e. immediate or deferred report) and level (i.e. per PDU session or per rating group). In such scenarios, the CTF 10 monitors the service consumption and reports back to the CHF 20 when one or more of the defined types of triggers are fulfilled.

With continued reference to FIG. 2, when a service is started 200, the CTF 10 sends 201 a Charging Data Request message to CHF 20, which includes other relevant information, e.g., identity of the subscriber (e.g., MSISDN) and service characteristics requested. Service characteristics may identify any one or more of a location of a service, a time of service (e.g., timestamp), a charging rate group, a category of service, etc. Example categories of service may include any one or more of a web browser service, game application service, social media application service (e.g., Facebook), audio and/or video streaming service (e.g., NetFlix), utility service, multimedia messaging service, etc.

Based on subscriber's account and the information received, the CHF 20 sends 202 a request message, which can identify the subscriber and the service characteristics, to the NWDAF 30 which requests the NWDAF 30 send an idle score that is determined based on the historical idle time associated with the identified subscriber and service characteristics.

The NWDAF 30 sends 203 a response message containing the idle score to the CHF 20 in response to the request message 202. From the implementation perspective, the NWDAF 30 may provide the idle score as a relative score or as an absolute value. The NWDAF 30 may utilize a predictive model that operates based on machine learning algorithms, artificial intelligence algorithms, and/or curve-fitting relationships that extrapolate based on historical data, and that have been trained or configured to operate based on historical data which has been accumulated over time indicating idle occurrences (e.g., time of day, day of week, length of idle, etc.) of the subscriber and service characteristics and/or operates based on statistical characterizations or numerical relationships derived from the historical data.

Based on the idle score received 203, the CHF 20 will determine 204 a UCIT value (which may be determined to be an optimal UCIT value based on the idle score for the subscriber and service characteristics) that should be allocated to the subscriber (which again may be an IoT device) and service characteristics requested. In one embodiment, a relatively low idle score corresponds to a subscriber and service characteristics that is more active, i.e., has less idle times in a defined time period, and therefore the UCIT value is determined as a higher value so the NF (CTF) 10 will less frequently trigger converged charging release to the CHF 20. Similarly in a further embodiment, a relatively high idle score corresponds to a subscriber and service characteristics that is less active, i.e., has more idle times in a defined time period, and therefore the UCIT value is determined as a lower value so the NF (CTF) 10 will trigger converged charging release earlier based on the lower value of UCIT.

In one embodiment the CHF 20 determines the UCIT value based on using the received idle score to obtain (e.g., use the received idle score as a pointer within) the UCIT value from a data structure which maps a set of idle scores to a corresponding set of UCIT values.

In another embodiment the CHF 20 determines the UCIT value using machine learning to adapt a defined historical relationship between received idle scores and resulting UCIT values over time based on trends or other associations determined from idle reports received from the NF (CTF) 10 over time for service characteristics provided for an identified subscriber. For example, the CHF 20 may adapt the relationship responsive to identifying instances of when a UCIT value determined for a particular idle score did not accurately predict idle time operational behavior for the subscriber and service characteristics, e.g., resulted in too early timeout and resulting converged charging release (e.g., the subscriber was only temporarily idle for a duration exceeding the UCIT value and subsequently further intended service usage). In other words, when the UCIT value that is needed is determined to result in a non-optimal timeout by the NF (CTF) 10 then adapt the relationship between the idle scores and UCIT values.

The CHF 20 responds by sending 205 a charging data response message back to the CTF 10, where the charging data response message includes the UCIT value and other parameters, such as indication(s) for how the CTF 10 is to handle and monitor the ongoing service such as by setting one or more types of triggers (Quality of Service (QoS) change, radio access technology (RAT) type change, Tariff time change), indication(s) of charging report handling category (i.e. immediate or deferred report), and/or indication(s) of report handling level (i.e. per PDU session or per rating group).

The CTF 10 responsively performs monitoring 206 of the service based on the received UCIT value and other parameters. With the UCIT value received, the CTF's 10 interaction with CHF 20 due to the UCIT value becoming met can be kept to a minimum and/or will cause network resources to be released closer in time to when the network resources are likely no longer needed for a communication session.

For example, a subscriber who is known by the NWDAF 30 to have a tendency to idle out intermittently, is correspondingly provided by the CHF 20 a relatively small value of UCIT to cause quicker release of the network resources based on the idle score from the NWDAF 30 indicating the subscriber is likely to become idle. Similarly, another subscriber who is known by the NWDAF 30 to who have a tendency not to become idle during the session, is correspondingly provided by the CHF 20 a relatively large value of UCIT so that release of network resources should not become triggered at least due to UCIT expiry.

In another example related to tracking IoT charging, IoT devices which are known by the NWDAF 30 to need to send data only once during a communication session (e.g. smart meters) are correspondingly given by the CHF 20 a relatively small value of UCIT so that network resources used for tracking charging related to the communication session quickly become released (to become available for use by other session(s)) as soon as data (in this example, by smart meters) is transmitted. Furthermore, IoT devices which are known by the NWDAF 30 to perform more continuous transmission of data (e.g. smart wearables) are correspondingly given by the CHF 20 a larger value of UCIT so that the session is not terminated at least due to expiry of UCIT.

Although the NWDAF has been illustrated in FIG. 2 and elsewhere as being separate from the CHF, in some other embodiments the NWDAF functionality is at least partially or entirely incorporated within the CHF or within another network node such as a billing system node or operations and maintenance (OAM) system node, e.g., as a Management Data Analytics Services (MDAS). Thus, as used here, the term NWDAF is not to be constrained as interpreted as having any specialized functions other than as specifically disclosed herein in accordance with the various embodiments.

Figure 3:
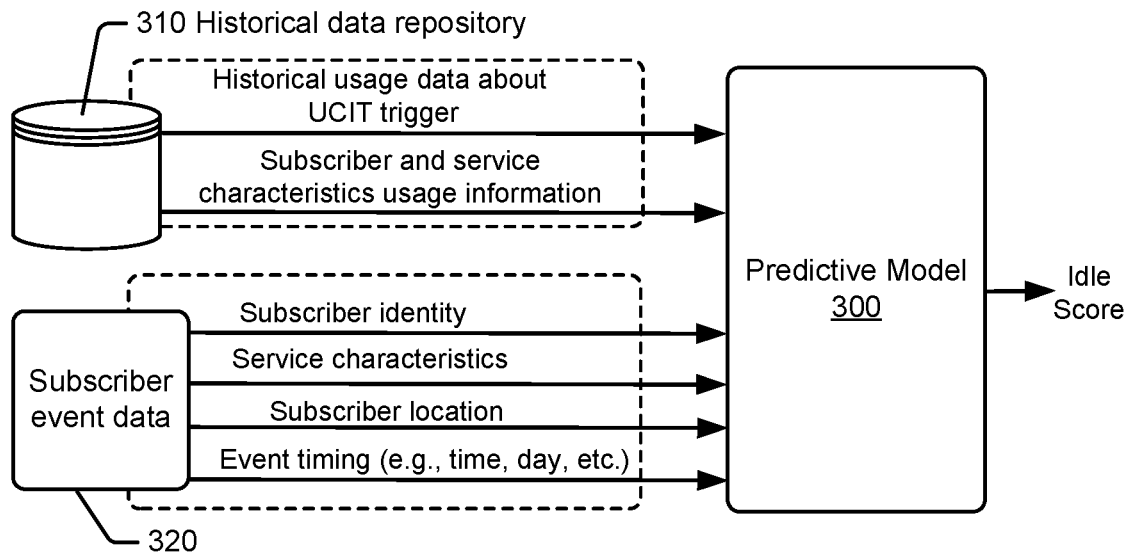
FIG. 3 illustrates a predictive model used by the NWDAF or another network node to determine an idle score based on historical usage data from a historical usage data repository and based on an identity of the subscriber and service characteristics which is indicated by subscriber event data, in accordance with some embodiments of the present disclosure.

FIG. 3 illustrates a predictive model 300 used by the NWDAF 30 or another network node to determine an idle score based on historical usage data from a historical usage data repository 310 and based on an identity of the subscriber (e.g., MSISDN) and service characteristics which is indicated by subscriber event data 320, which may be content of the message 202 (FIG. 2). The idle score indicates the predicted idle behavior for an identified subscriber (e.g., 5G subscriber or IoT device) and service characteristics, where the prediction is performed based on the historical usage data that has been accumulated relating to the identified subscriber and service characteristics.

The historical usage data repository 310 may correspond to a data structure in memory used by the NWDAF 30, or may correspond to a database that is part of or networked to the NWDAF 30. The historical usage data indicates previously tracked usage of network resources (e.g., idle behaviour) by identified subscribers or by combinations of identified subscribers and types of service. For example, the historical usage data may identify what idle behaviour has been reported over time for identified subscribers and types of service. In one embodiment, the historical usage data is arranged as a listing of previously tracked usage of network resources (e.g., idle behaviour) corresponding to each of a plurality of combinations of subscriber identifies and types of service.

In one embodiment, the historical data repository 310 contains or characterizes (e.g., statistically characterizes) the historical usage data which is obtained from usage monitors that have been setup in the network to provide reports of the subscribers' idle behaviour. Using the historical usage data, the NWDAF 30 determines an idle score (representing the idle behaviour of the subscriber and service characteristics) and transmits the idle score back to the CHF 20 in response to the request message.

In some other embodiments, the predictive model 300 is implemented in the CHF 20.

The historical usage data can include any one or more of the following in accordance with various embodiments: 1) historical information indicating where SMF triggered release towards CHF 20 due to expiry of "Unit Count Inactivity Timer"; and 2) historical information about the service usage of the subscriber (e.g., 5G subscriber or IoT device) that include usage behavior in terms of data usage at a particular subscriber location, event timing (e.g., time of day, day, etc.), service characteristics, etc. For example, the historical usage data can indicate that the subscriber tends to remain active during the evening hours at the subscriber's office location, etc.

The predictive model 300 can process the subscriber event data 320 associated with a new charging data request (e.g., flow 201 of FIG. 2) that is initiated by the subscriber (e.g., 5G subscriber or IoT device). The subscriber event data can identify a subscriber and service characteristics which may optionally include any one or more of:

1) Subscriber event location, e.g., the location from where the subscriber event (such as charging data request) has been initiated by the subscriber (e.g., 5G subscriber or IoT device);
2) Timestamp associated with the subscriber event;
3) Identity of the service; and
4) Service Type, e.g., service characteristics for which the charging data request is initiated. Examples types of service can include video streaming, virtual reality (VR), augmented reality (AR), gaming, IoT application (e.g. smart wearables, smart meters, home automation, industrial control), web browsing, etc.

In this manner, the predictive model 300 processes the historical usage data and the subscriber event data to determine the idle score that can be provided to the requesting entity (CHF in this case). The idle score can thereby be indicative of the actual historical idle behavior of the subscriber and which may be determined using granularity of subscriber location, service characteristics being accessed, time of the day when service is being accessed, day of the week when service is accessed, and/or other tracked characteristics of historical usage. That is, since the subscriber (e.g., 5G subscriber or IoT device) may have different usage characteristics at different time/location/service etc., that trend can be processed by the predictive model 300 when determining the idle score and, thereby, increases the accuracy with which the usage score will predict the likely idle behavior of the newly started service (e.g., step 200 in FIG. 2).

The historical data repository 310 can be populated over a long period of time as exemplified below.

Figure 4:
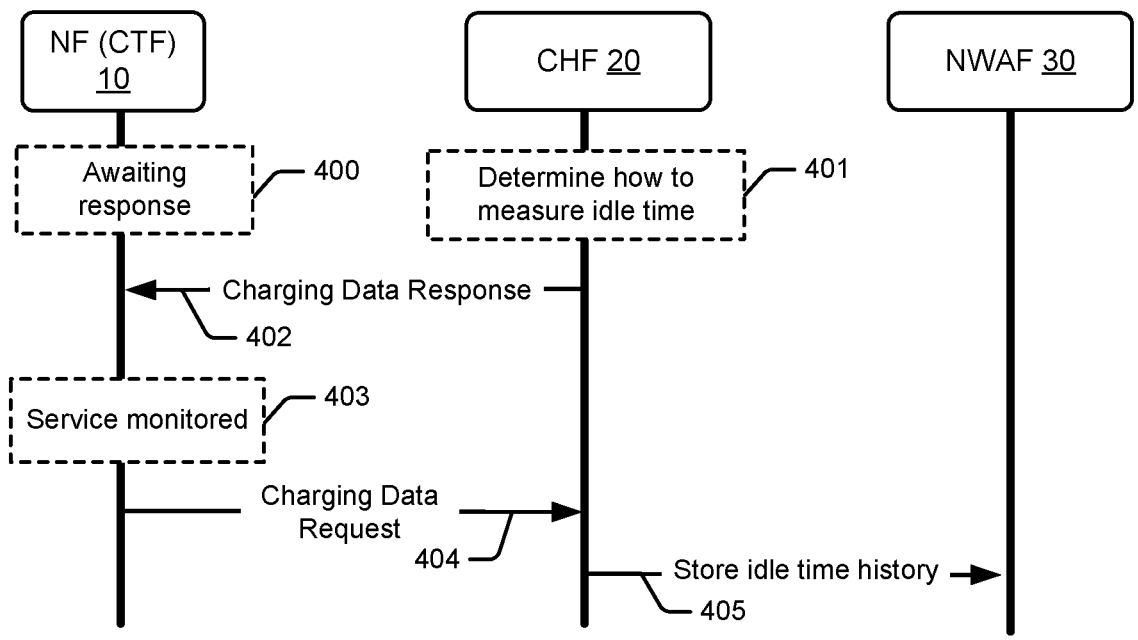
FIG. 4 illustrates a CHF controlled historical usage data collection in accordance with some embodiments of the present disclosure.

FIG. 4 illustrates a CHF 20 controlled historical usage data collection in accordance with some embodiments. In the example of FIG. 4, an end user has started a service and the CTF 10 is awaiting 400 a response from the CHF 20. The CHF 20 prepares the response by determining 401 how idle time is to be measured by the CTF 10 and reported from the CTF 10 to the CHF 20, which can correspond to how long of an idle time shall be counted, in what time steps should the count be incremented, how many counts shall be collected before reporting, etc. For example, the CHF 20 may determine 401 that the CTF 10 shall operate to measure and report idle time as follows: that any idle time longer than 1 min will be counted, once an idle time is longer than 1 minute the count will be incremented every 2 additional minutes that the idle time continues to occur, and a maximum of 50 counted idle time instances (i.e., sequentially and separately counted instances spaced apart in time by periods of non-idle times) will be collected before reporting.

The CHF 20 sends a charging data response 402 message containing information (e.g., grant quota and request to monitor idle times) identifying the determined 401 conditions for how idle time is to be measured by the CTF 10 and reported to the CHF 20. The CTF 10 responsively monitors the ongoing service being provided, to the identified subscriber and service characteristics, for idle times which are measured according to the received information identifying the determined 401 conditions.

In other words, the CTF is provided configuration data that controls how it performs idle time measurement and when it generates reports containing data characterizing the idle time measurements and identifying the subscriber and the service characteristics. In one embodiment, the configuration data, which can be received in the charging data response message, controls what idle threshold time needs to expire to trigger an idle counter to start a count of idle time, once the idle counter is started the configuration data controls what repeating time threshold period needs to expire during continuing idle to incrementally increase the count of idle time, and controls how many counts are collected before triggering sending of the report to the CHF.

Due to a service event, CTF 10 sends a new Charging Data Request message 404 to the CTF 10 which includes the number of idle times which have been counted in the different steps, e.g., 5 idle times longer than 1 min and shorter than 3 min, 10 idle times longer than 3 min and shorter than 5 min. The CHF 20 responsively stores 405 the idle times in a data structure, e.g., the historical data repository 310, maintained by the NWDAF 30 with an association to the identity of the subscriber together with the service characteristics that was being monitored 403.

In another embodiment, the NWDAF 30 may perform some or all of the operations 401 to determine how idle time is to be measured by the CTF 10 and reported from the CTF 10 to the CHF 20. The NWDAF 30 may then provide the idle time measurement and reporting information to the CHF 20 for providing to the CTF 10, or the NWDAF 30 may provide the idle time measurement and reporting information directly to the CTF 10.

Figure 5:
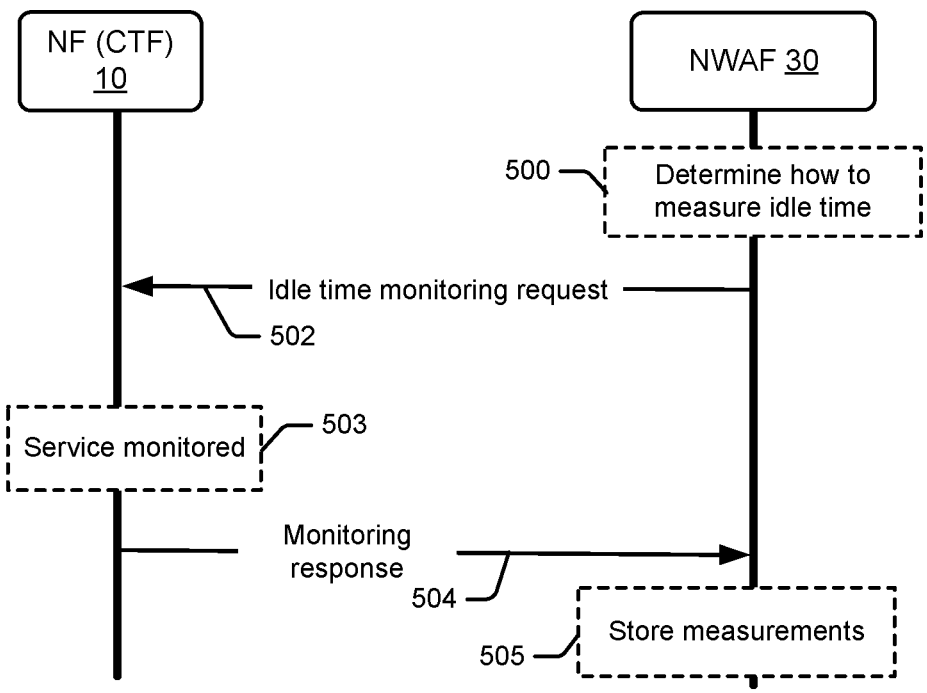
FIG. 5 illustrates a NWDAF controlled historical usage data collection in accordance with some embodiments of the present disclosure.

FIG. 5 illustrates a NWDAF 30 controlled historical usage data collection in accordance with some embodiments. The operations shown in FIG. 5 may be performed off-line or on-line during an ongoing session. Referring to FIG. 5, the NWDAF 30 selects the NF (CTF) 10, which may be a SMF, that will provide the usage measurements and determines 500 how idle time is to be measured by NF (CTF) 10 and reported, which can correspond to how long of an idle time shall be counted, in what time steps should the count be incremented, how many counts shall be collected before reporting, etc. In other words, the CTF is provided configuration data that controls how it performs idle time measurement and when it generates reports containing data characterizing the idle time measurements and identifying the subscriber and the service characteristics. In one embodiment, the configuration data controls what idle threshold time needs to expire to trigger an idle counter to start a count of idle time, once the idle counter is started the configuration data controls what repeating time threshold period needs to expire during continuing idle to incrementally increase the count of idle time, and controls how many counts are collected before triggering sending of the report to the CHF.

The NWDAF 30 may instruct the NF (CTF) 10 which particular subscribers and types of services are to be monitored for idle time measurements and reporting. For example, the NWDAF 30 may determine 500 that the NF (CTF) 10 shall operate to measure and report idle time as follows: that any idle time longer than 1 min will be counted, once an idle time is longer than 1 minute the count will be incremented every 2 additional minutes that the idle time continues to occur, and a maximum of 50 counted idle time instances (i.e., sequentially and separately counted instances spaced apart in time by periods of non-idle times) will be collected before reporting.

The NWDAF 30 sends an idle time monitoring request message 502 containing information requesting monitoring of idle times and the determined 500 conditions for how idle time is to be measured by the NF (CTF) 10 and reported. The NF (CTF) 10 responsively monitors the ongoing service being provided, to the identified subscriber and service characteristics, for idle times which are measured according to the received information identifying the determined 500 conditions.

The NF (CTF) 10 collects the information and sends 504 a monitoring response report indicating the number of measured idle times which have been counted in the different steps, e.g., 5 idle times longer than 1 min and shorter than 3 min, 10 idle times longer than 3 min and shorter than 5 min. The NWDAF 30 responsively stores 505 the measured idle times in a data structure, e.g., the historical data repository 310, with an association to the identity of the subscriber together with the service characteristics that was being monitored 503.

In FIGS. 1-5 although various arrows are used to convey example communication directions, the illustrated arrows are not limiting and the communications can occur in the opposite directions to those illustrated and often occur in both directions.

Accordingly as explained above with reference to the illustrated figures, idle time history is obtained and used to determine the optimal value of "Unit Count Inactivity Timer" to be used when monitoring service being provided to a subscriber, which can result in more optimized resource utilization in the network elements.

Figure 6:
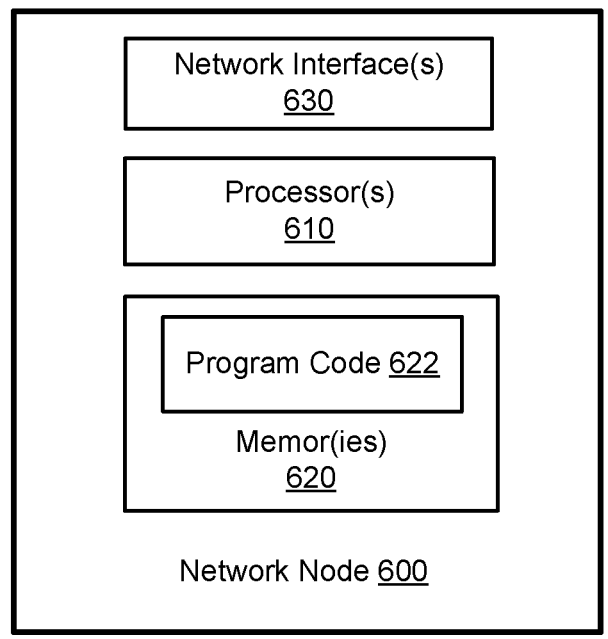
FIG. 6 is a block diagram of a network node which may implement a NF (CTF), a CHF, and/or a NWDAF and contain elements that are configured according to some embodiments of the present disclosure.

FIG. 6 is a block diagram of a network node 600 which may implement any the NF (CTF) 10, the CHF 20, and/or the NWDAF 30 and contains elements that are configured according to some embodiments. The network node 600 can include one or more network interfaces 630 (referred to as "network interface" for brevity), one or more processors 610 (referred to as "processor" for brevity), and one or more memories 620 (referred to as "memory" for brevity) containing program code 622.

The network interface 630 may be configured to communicate through a wired interface, e.g., Ethernet, and/or wireless interface, e.g., wireless transceiver, according to one or more proprietary protocols and/or industry standardized protocols, e.g., WiFi, 3GPP 4G, 5G (NR), etc. The processor 610 may include one or more data processing circuits, such as a general purpose and/or special purpose processor (e.g., microprocessor and/or digital signal processor) that may be collocated or distributed across one or more networks. The processor 610 is configured to execute program code 622 in the memory 620, described below as a computer readable medium, to perform some or all of the operations and methods that are described above for one or more of the embodiments of an NF (CTF), CHF, and NWDAF, such as regarding one or more of the embodiments described herein.

Various of the above embodiments have been described in the context of the example network nodes of the communications network shown in FIGS. 1-5. However, these embodiments are limited thereto and may be embodied in any type of one or more network nodes of any type of communications network, such as a 4G/LTE or other 5G network. More general operations and network nodes are therefore now described below with reference to the following flowcharts.

Figure 7:
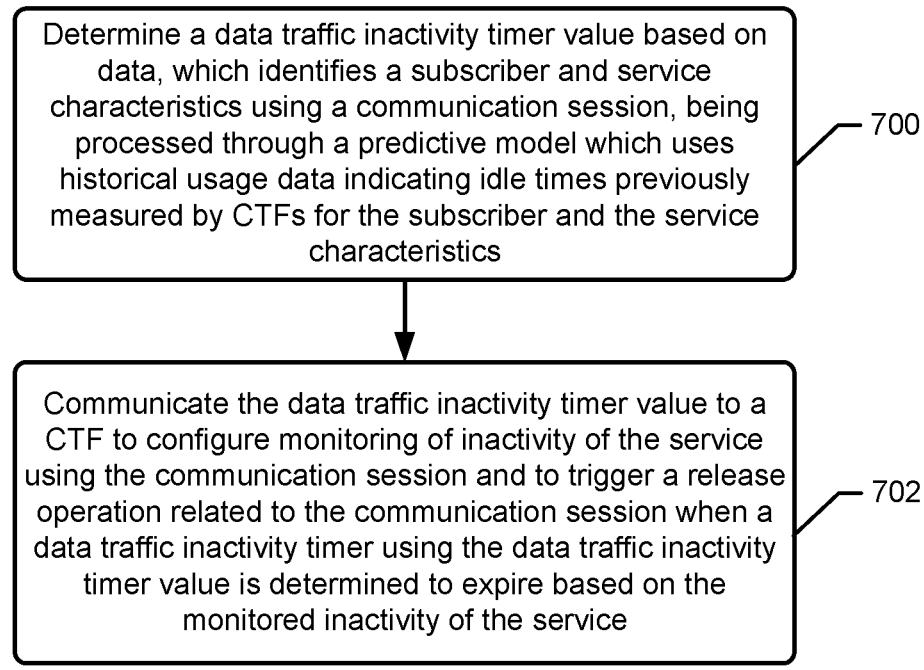
FIGS. 7 and 8 are flowcharts illustrating operations that can be performed by one or more network nodes of a communications network in accordance with some embodiments of the present disclosure.
Figure 8:
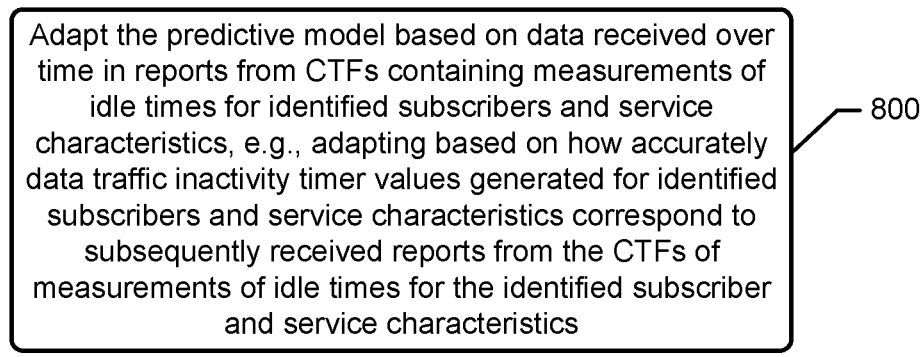

FIGS. 7 and 8 are flowcharts illustrating operations that can be performed by one or more network nodes of a communications network in accordance with some embodiments of the present disclosure.

Referring initially to FIG. 7, the operations determine 700 a data traffic inactivity timer value based on data, which identifies a subscriber and service characteristics using a communication session, being processed through a predictive model which uses historical usage data indicating idle times previously measured by charging trigger functions, CTFs, for the subscriber and the service characteristics. The operations further communicate 702 the data traffic inactivity timer value to a CTF to configure monitoring of inactivity of the service using the communication session and to trigger a release operation related to the communication session when a data traffic inactivity timer using the data traffic inactivity timer value is determined to expire based on the monitored inactivity of the service.

In some embodiments, the data traffic inactivity timer is a unit count inactivity timer, UCIT, for which expiration of the UCIT triggers the release operation that releases reservation of network resources for the communication session and terminates the communication session. The operation to release the reservation of network resources for the communication session may release all network resources or may release only certain network resources such as by only releasing CHF resources, in accordance with various embodiments.

In some embodiments, the data traffic inactivity timer is a quota holding timer, QHT, used for Diameter protocol communications for the communication session for which expiration of the QHT triggers the release operation that releases reservation of a charge quota that has been maintained against a subscriber account for the service using the communication session.

Some further embodiments are directed to a CHF determining the data traffic inactivity timer using an idle score from the NWDAF, i.e., where the predictive model is within the NWDAF, e.g., in OAM or other type of network node. In one embodiment, the network node includes a CHF network node. The operations to determine 700 the data traffic inactivity timer value include sending (202 in FIG. 2) a request message containing the data identifying the subscriber and the service characteristics to a NWDAF network node containing the predictive model, wherein the request message requests the NWDAF network node determine an idle score based on processing the data identifying the subscriber and the service characteristics through the predictive model. The operations further determine 204 the data traffic inactivity timer value based on the idle score received from the NWDAF network node.

In a further embodiment, the operations to determine 204 the data traffic inactivity timer value based on the idle score received from the NWDAF network node, include using the idle score to obtain the data traffic inactivity timer value from a data structure which maps a set of idle scores to a corresponding set of data traffic inactivity timer values.

In another further embodiment, the operations to determine 204 the data traffic inactivity timer value based on the idle score received from the NWDAF network node, include processing the idle score through a defined historical relationship between previous idle scores received from the NWDAF network node and corresponding previously determined data traffic inactivity timer values, wherein the defined historical relationship is adapted over time based on how accurately the previously determined data traffic inactivity timer values determined from the previous idle scores predicted what the CTFs measured as idle time operational behavior for the identified subscriber and service characteristics.

Some other further embodiments are directed to CHF having the predictive model to determine the data traffic inactivity timer without relying on a NWDAF or other such network node. In one embodiment illustrated in FIG. 8, the network node includes a CHF network node containing the predictive model. The operations to determine the data traffic inactivity timer value include processing the data identifying the subscriber and the service characteristics through the predictive model to generate the data traffic inactivity timer value. In a further embodiment, the operations further include adapting 800 the predictive model based on subscriber event data received over time in reports from CTFs containing measurements of idle times for identified subscribers and types of services. In still a further embodiment, operations to adapt 800 the predictive model are based on how accurately data traffic inactivity timer values generated for identified subscribers and types of services correspond to subsequently received reports from the CTFs of measurements of idle times for the identified subscriber and service characteristics.

Some other further embodiments are directed to how the CHF configures idle time measurements and reporting by CTF. In one embodiment, the network node includes a CHF network node and the operations further sending from the CHF network node to the CTF in a charging data response message (e.g., 205 in FIG. 2) the data traffic inactivity timer value and configuration data that configures idle time measurements by the CTF and reporting by the CTF of the idle time measurements to the CHF network node.

Figure 9:
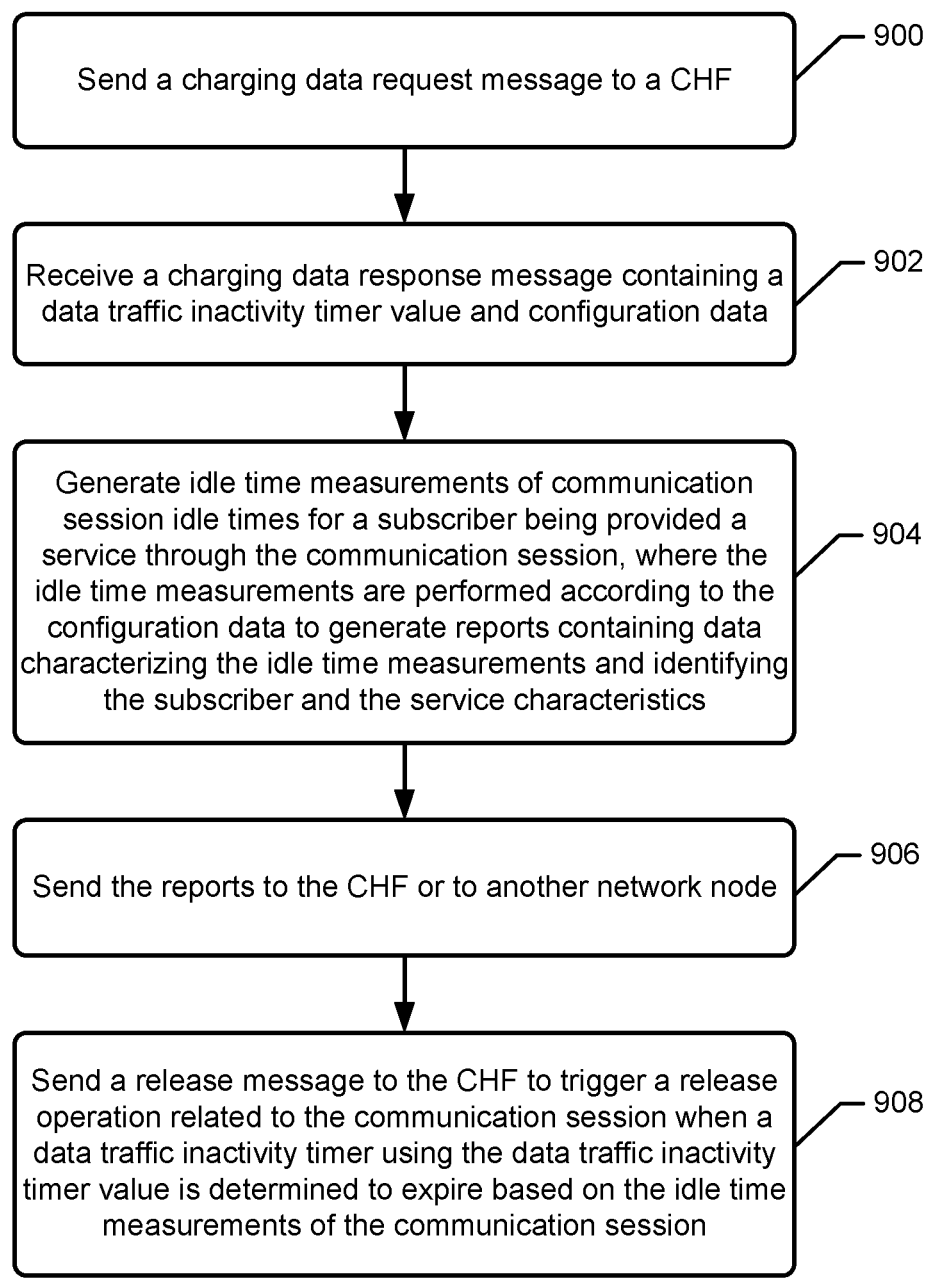
FIG. 9 is a flowchart of operations that can be performed by a CTF in accordance with some embodiments of the present disclosure.

Some other embodiments are directed to operations that can be performed by a CTF of the communications network. FIG. 9 is a flowchart of operations that can be performed by a CTF in accordance with some embodiments.

Referring to FIG. 9, the operations include sending 900 (e.g., also 201 in FIG. 2) a charging data request message to a CHF network node. The operations received 902 (e.g., also 205 in FIG. 2) a charging data response message containing a data traffic inactivity timer value and configuration data. Operations generate 904 (e.g., also 206 in FIG. 2, 403 in FIG. 4, 503 in FIG. 5) idle time measurements of communication session idle times for a subscriber being provided a service through the communication session. The idle time measurements are performed according to the configuration data to generate reports containing data characterizing the idle time measurements and identifying the subscriber and the service characteristics. Operations send 906 (e.g., also 404 in FIG. 4, 504 in FIG. 5) the reports to the CHF network node or to another network node (e.g., NWDAF 30). Operations send 908 (e.g., also 101 in FIG. 1) a release message to the CHF network node to trigger a release operation related to the communication session when a data traffic inactivity timer using the data traffic inactivity timer value is determined to expire based on the idle time measurements of the communication session.

In a further embodiment, the operations the configuration data received in the charging data response message controls what idle threshold time needs to expire to trigger an idle counter to start a count of idle time, once the idle counter is started the configuration data controls what repeating time threshold period needs to expire during continuing idle to incrementally increase the count of idle time, and controls how many counts are collected before triggering sending of the report to the CHF network node.

| Abbreviations | Explanation |
| --- | --- |
| BSS | Business Support Systems |
| CHF | Charing Function |
| CTF | Charging Trigger Function |
| GGSN | Gateway GPRS Support Node |
| NF | Network Function |
| NWDAF | Network Data Analytics Function |
| PGW | Packet Gateway |
| SMF | Session Management Function |
| UCIT | Unit Count Inactivity Timer |

In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A method by a network node of a communications network, the method comprising:
   determining a data traffic inactivity timer value based on subscriber event data, which identifies a subscriber and service characteristics using a communication session, being processed through a predictive model which uses historical usage data indicating idle times previously measured by charging trigger functions, CTFs, for the subscriber and the service characteristics; and
   communicating the data traffic inactivity timer value to a CTF to configure monitoring of inactivity of the service using the communication session and to trigger a release operation related to the communication session when a data traffic inactivity timer using the data traffic inactivity timer value is determined to expire based on the monitored inactivity of the service.

2. The method of claim 1, wherein the network node comprises a charging function, CHF, network node and wherein:
   the communicating comprises sending from the CHF network node to the CTF in a charging data response message the data traffic inactivity timer value and configuration data that configures idle time measurements by the CTF and reporting by the CTF of the idle time measurements to the CHF network node.

3. The method of claim 1, wherein the data traffic inactivity timer is a unit count inactivity timer, UCIT, for which expiration of the UCIT triggers the release operation that releases reservation of network resources for the communication session and terminates the communication session.

4. The method of claim 1, wherein the data traffic inactivity timer is a quota holding timer, QHT, used for Diameter protocol communications for the communication session for which expiration of the QHT triggers the release operation that releases reservation of a charge quota that has been maintained against a subscriber account for the service using the communication session.

5. The method of claim 1, wherein the network node comprises a charging function, CHF, network node and wherein the determining of the data traffic inactivity timer value comprises:
   sending a request message containing the subscriber event data identifying the subscriber and the service characteristics to a network analytics function, NWDAF, network node containing the predictive model, wherein the request message requests the NWDAF network node determine an idle score based on processing the subscriber event data identifying the subscriber and the service characteristics through the predictive model; and
   determining the data traffic inactivity timer value based on the idle score received from the NWDAF network node.

6. The method of claim 5, wherein the determining of the data traffic inactivity timer value based on the idle score received from the NWDAF network node comprises:
   using the idle score to obtain the data traffic inactivity timer value from a data structure which maps a set of idle scores to a corresponding set of data traffic inactivity timer values.

7. The method of claim 5, wherein the determining of the data traffic inactivity timer value based on the idle score received from the NWDAF network node comprises:
   processing the idle score through a defined historical relationship between previous idle scores received from the NWDAF network node and corresponding previously determined data traffic inactivity timer values, wherein the defined historical relationship is adapted over time based on how accurately the previously determined data traffic inactivity timer values determined from the previous idle scores predicted what the CTFs measured as idle time operational behavior for the identified subscriber and service characteristics.

8. The method of claim 1, the network node comprises a charging function, CHF, network node containing the predictive model, and wherein:
   the determining of the data traffic inactivity timer value comprises processing the subscriber event data identifying the subscriber and the service characteristics through the predictive model to generate the data traffic inactivity timer value.

9. The method of claim 8, further comprising:
   adapting the predictive model based on subscriber event data received over time in reports from CTFs containing measurements of idle times for identified subscribers and types of services.

10. The method of claim 9, wherein:
    the adapting of the predictive model is based on how accurately data traffic inactivity timer values generated for identified subscribers and types of services correspond to subsequently received reports from the CTFs of measurements of idle times for the identified subscriber and service characteristics.

11. A method by a charging trigger function, CTF, of a communications network, the method comprising:
    sending a charging data request message to a charging function, CHF, network node;
    receiving a charging data response message containing a data traffic inactivity timer value and configuration data;
    generating idle time measurements of communication session idle times for a subscriber being provided a service through the communication session, wherein the idle time measurements are performed according to the configuration data to generate reports containing data characterizing the idle time measurements and identifying the subscriber and the service characteristics;
    sending the reports to the CHF network node or to another network node; and
    sending a release message to the CHF network node to trigger a release operation related to the communication session when a data traffic inactivity timer using the data traffic inactivity timer value is determined to expire based on the idle time measurements of the communication session.

12. The method of claim 11, wherein the configuration data received in the charging data response message controls what idle threshold time needs to expire to trigger an idle counter to start a count of idle time, once the idle counter is started the configuration data controls what repeating time threshold period needs to expire during continuing idle to incrementally increase the count of idle time, and controls how many counts are collected before triggering sending of the report to the CHF network node.

13. A network node of a communications network, the network node comprising:
   at least one processor; and
   at least one memory coupled to the at least one processor and storing computer readable program code that when executed by the at least one processor causes the at least one processor to perform operations configured to:
      determine a data traffic inactivity timer value based on subscriber event data, which identifies a subscriber and service characteristics using a communication session, being processed through a predictive model which uses historical usage data indicating idle times previously measured by charging trigger functions, CTFs, for the subscriber and the service characteristics; and
      communicate the data traffic inactivity timer value to a CTF to configure monitoring of inactivity of the service using the communication session and to trigger a release operation related to the communication session when a data traffic inactivity timer using the data traffic inactivity timer value is determined to expire based on the monitored inactivity of the service.

14. The network node of claim 13, wherein the network node comprises a charging function, CHF, network node and the communication of the data traffic inactivity timer value to a CTF comprises sending from the CHF network node to the CTF in a charging data response message the data traffic inactivity timer value and configuration data that configures idle time measurements by the CTF and reporting by the CTF of the idle time measurements to the CHF network node.

15. The network node of claim 13, wherein the data traffic inactivity timer is a unit count inactivity timer, UCIT, for which expiration of the UCIT triggers a release operation that releases reservation of network resources for the communication session and terminates the communication session.

16. The network node of claim 13, wherein the data traffic inactivity timer is a quota holding timer, QHT, used for Diameter protocol communications for the communication session for which expiration of the QHT triggers a release operation that releases reservation of a charge quota that has been maintained against a subscriber account for the service using the communication session.

17. The network node of claim 13, wherein the network node comprises a charging function, CHF, network node and wherein the operations to determine the data traffic inactivity timer value are further configured to:
   send a request message containing the subscriber event data identifying the subscriber and the service characteristics to a network analytics function, NWDAF, network node containing the predictive model, wherein the request message requests the NWDAF network node determine an idle score based on processing the subscriber event data identifying the subscriber and the service characteristics through the predictive model; and
   determine the data traffic inactivity timer value based on the idle score received from the NWDAF network node.

18. The network node of claim 17, wherein the operations to determine the data traffic inactivity timer value based on the idle score received from the NWDAF network node are further configured to:
   use the idle score to obtain the data traffic inactivity timer value from a data structure which maps a set of idle scores to a corresponding set of data traffic inactivity timer values.

19. The network node of claim 17, wherein the operations to determine the data traffic inactivity timer value based on the idle score received from the NWDAF network node are further configured to:
   process the idle score through a defined historical relationship between previous idle scores received from the NWDAF network node and corresponding previously determined data traffic inactivity timer values, wherein the defined historical relationship is adapted over time based on how accurately the previously determined data traffic inactivity timer values determined from the previous idle scores predicted what the CTFs measured as idle time operational behavior for the identified subscriber and service characteristics.

20. The network node of claim 13, the network node comprises a charging function, CHF, network node containing the predictive model, and wherein:
   the determination of the data traffic inactivity timer value comprises processing the subscriber event data identifying the subscriber and the service characteristics through the predictive model to generate the data traffic inactivity timer value.

* * * * *